United States Patent
Paradies et al.

(10) Patent No.: US 8,316,291 B1
(45) Date of Patent: Nov. 20, 2012

(54) PACKAGING AN ELECTRONIC DOCUMENT AND/OR A METHOD OF DISPLAYING THE PACKAGE

(75) Inventors: Bernd Paradies, Seattle, WA (US); Nils Hausig, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1099 days.

(21) Appl. No.: 11/192,666

(22) Filed: Jul. 28, 2005

(51) Int. Cl.
*G06F 17/00* (2006.01)

(52) U.S. Cl. .................................................... 715/201

(58) Field of Classification Search .................... 715/201
See application file for complete search history.

(56) References Cited

U.S. PATENT DOCUMENTS

| | | | | |
|---|---|---|---|---|
| 5,956,737 A * | 9/1999 | King et al. | | 715/202 |
| 6,533,822 B2 * | 3/2003 | Kupiec | | 715/531 |
| 6,704,024 B2 * | 3/2004 | Robotham et al. | | 345/581 |
| 6,928,610 B2 * | 8/2005 | Brintzenhofe et al. | | 715/202 |
| 7,013,309 B2 * | 3/2006 | Chakraborty et al. | | 707/104.1 |
| 7,461,332 B2 * | 12/2008 | Brintzenhofe et al. | | 715/205 |
| 7,519,573 B2 * | 4/2009 | Helfman et al. | | 1/1 |
| 2003/0055871 A1 * | 3/2003 | Roses | | 709/203 |
| 2003/0115552 A1 * | 6/2003 | Jahnke et al. | | 715/536 |
| 2003/0140315 A1 * | 7/2003 | Blumberg et al. | | 715/527 |
| 2004/0095376 A1 * | 5/2004 | Graham et al. | | 345/716 |
| 2005/0120300 A1 * | 6/2005 | Schwager et al. | | 715/513 |
| 2005/0267894 A1 * | 12/2005 | Carnahan | | 707/10 |
| 2006/0041589 A1 * | 2/2006 | Helfman et al. | | 707/104.1 |
| 2006/0195431 A1 * | 8/2006 | Holzgrafe et al. | | 707/3 |
| 2006/0235868 A1 * | 10/2006 | Achilles et al. | | 707/102 |

OTHER PUBLICATIONS

U.S. Appl. No. 60/654,025, filed Feb. 16, 2005, Holzgrafe.
Adobe Systems Incorporated, Sep. 3, 2003, Technical Note #10084, Version InDesign CS, "Package for GoLive", 138 pages.

* cited by examiner

*Primary Examiner* — William Bashore
*Assistant Examiner* — Henry Orr
(74) *Attorney, Agent, or Firm* — Robert C. Kowert; Meyertons, Hood, Kivlin, Kowert & Goetzel, P.C.

(57) ABSTRACT

Embodiments of methods, apparatuses, systems and/or devices for packaging an electronic document and/or displaying the package are disclosed. In one embodiment, a first document including one or more digital media assets may be packaged. Packing the electronic document may comprise generating a second document comprising a rendering of at least a portion of the first document, extracting at least a portion of the digital media assets from the first document into one or more electronic files, and generating an electronic file comprising descriptive data for at least a portion of the extracted digital media assets.

39 Claims, 7 Drawing Sheets

PACKAGING AN ELECTRONIC DOCUMENT AND/OR A METHOD OF DISPLAYING THE PACKAGE

BACKGROUND

Electronic documents may comprise a compilation of data that may be represented in one or more data formats and/or in one or more data files. Such a compilation of data may be utilized to present a visual representation of the electronic document in any one of several types of media, such as print and/or electronic media. Electronic documents may additionally include data representative of one or more document objects, such as digital media assets. Digital media assets may include digital images, audio, video, graphics or text, for example. Electronic documents may include formatting data. The formatting data may provide formatting for the electronic document, to enable the electronic document to be embodied in a particular media, such as print media or electronic media.

An electronic document may be formatted for a particular use, such as, for example, forming a printed document, forming a web page and/or forming an electronic display of the document, for example. However, it may be desirable to utilize an electronic document formatted for a particular use for one or more other uses. Using an electronic document for uses in addition to the suited use may involve numerous formatting and editing processes. In one example, an electronic document may include formatting data enabling a printed representation of the electronic document. Such formatting data may produce desired properties in the printed representation. If the electronic document is utilized to produce a web page, for example, the electronic document may first have to be formatted in a different manner, which may be time intensive and/or processing intensive. A method of packaging an electronic document, such that the document may be suitable for one or more uses may address one or more of these limitations.

DESCRIPTION OF THE DRAWING FIGURES

The subject matter regarded as claimed subject matter is particularly pointed out and distinctly claimed in the concluding portion of the specification. Claimed subject matter, however, both as to organization and method of operation, together with objects, features, and advantages thereof, may best be understood by reference to the following detailed description when read with the accompanying drawings in which:

Figure 1A:
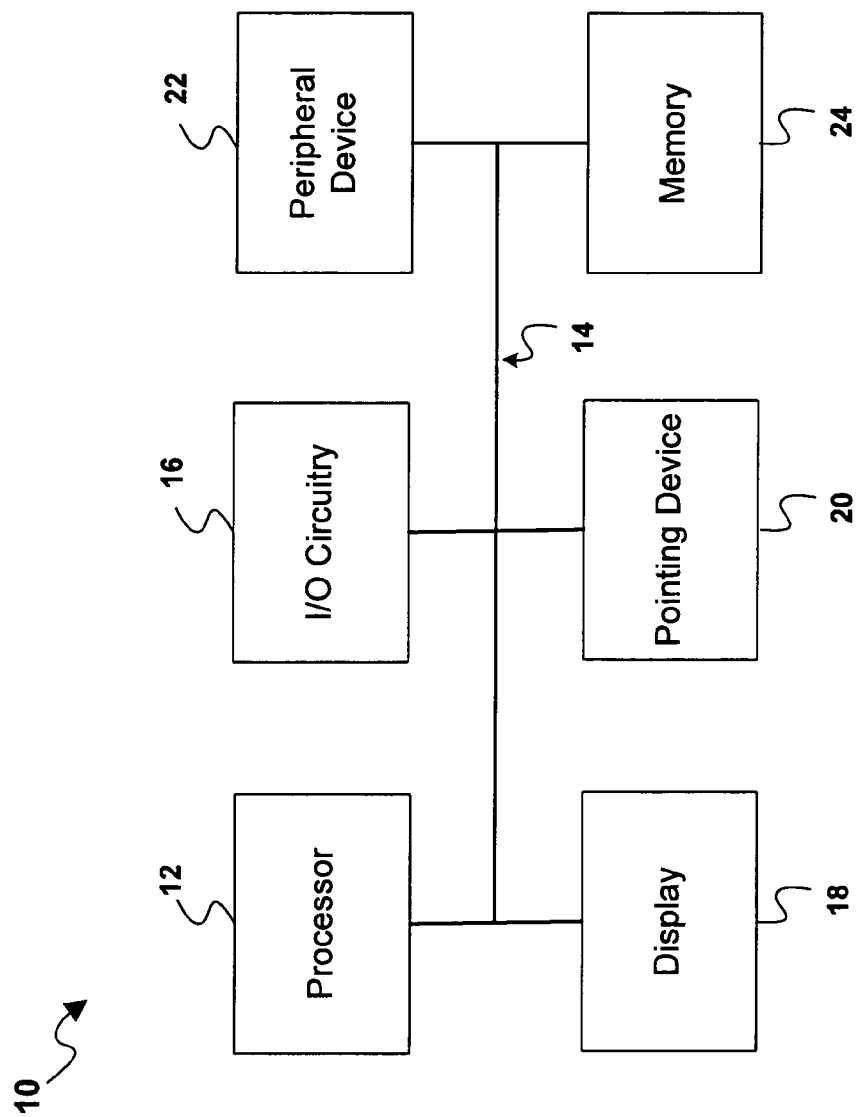
FIG. 1a is a block diagram of computing system capable of implementing one or more of the embodiments.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of claimed subject matter. However, it will be understood by those skilled in the art that claimed subject matter may be practiced without these specific details. In other instances, well-known methods, procedures, and components have not been described in detail.

Some portions of the detailed description that follows are presented in terms of algorithms, programs or the like and/or symbolic representations of operations on data bits or binary digital signals within a computer memory. These algorithmic descriptions and representations may be the techniques used in the data processing arts to convey the arrangement of a computer system or other information handling system to operate according to the programs.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system or other information handling system.

In the following description and claims, words or terms that connote a conditional occurrence with respect to time, such as when or upon, may mean at a particular instant in time and may also mean near a particular instant in time and may include times preceding the instant in time and times subsequent to the instant in time, for example after a delay period from the particular instant in time. In addition, where a publicly available or commonly utilized standard is discussed, any one or more promulgated versions of the standard may be suitable for any one or more embodiments, and may include prior versions, current versions, and/or future adopted versions.

Embodiments may include apparatuses or systems for performing the operations herein. This apparatuses or systems may be specially constructed for the desired purposes, or it may comprise a general purpose computing system selectively activated or configured by a program stored in the device. Such a program may be stored on a storage medium, which may comprise a portion of a memory device of a computing system. For example, referring now to FIG. 1a, there is illustrated a computing system 10 that may be utilized to implement one or more of the embodiments disclosed herein. However, claimed subject matter is not so limited, and various general purpose systems may be used with programs in accordance with the teachings herein, or it may prove convenient to construct a more specialized apparatus to perform the desired method. Illustrated in FIG. 1a comprises system 10. System 10 in one embodiment may comprise a computing system suitable for executing software instructions to perform one or more of the processes described herein. System 10 may include a processor 12 coupled to a bus 14. Additionally coupled to the bus 14 may be memory 24, which may comprise one or more devices such as one or more types of storage medium as described previously. A program may be stored in the memory device, which may comprise, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device or other information handling system.

System 10 may further include input/output (I/O) circuitry 16, which may be capable of sending and/or receiving electronic data. System 10 includes an electronic display device 18, which may be coupled to the bus 14. One or more types of pointing devices 20 may be coupled to the bus 14. Additionally, one or more peripheral devices 22 not described in detail may be included as part of system 10, in at least one embodiment. According to a particular embodiment, although the claimed subject matter is not so limited, computing system 10 may integrate display 18 and I/O circuitry 16 to send and/or receive data on a graphical user interface (GUI). A GUI may be configured to receive one or more inputs from computing system 10, such as by use of a pointing device 20. Additionally, the display device 18 may be capable of displaying a visual representation of one or more files and/or one or more electronic documents, and the visual representation may comprise a viewable document, as will be explained in more detail later.

Figure 1B:
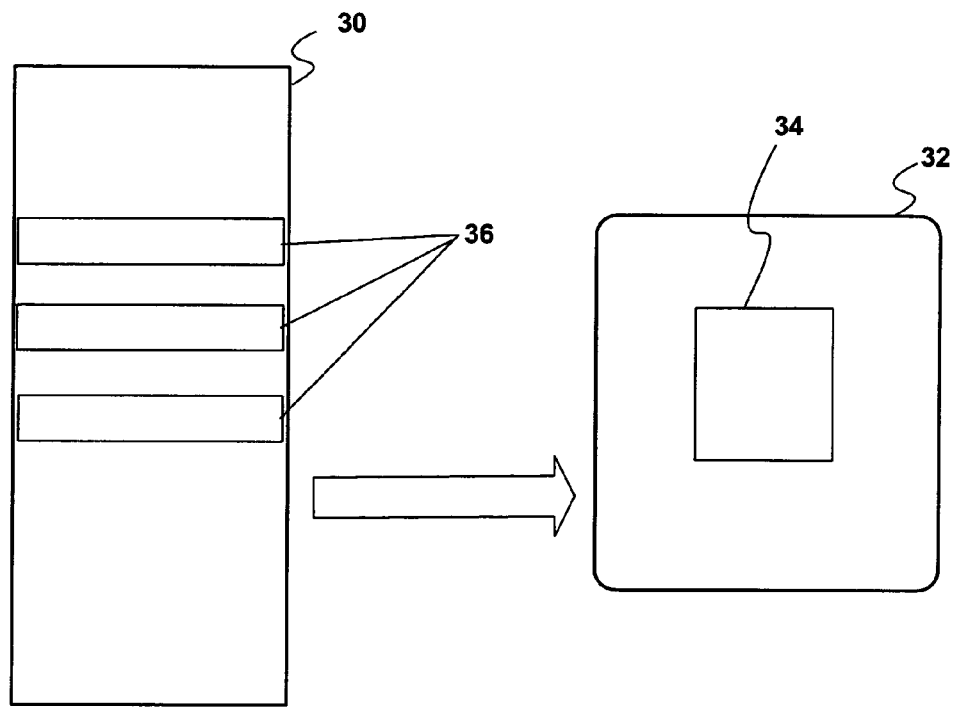
FIG. 1b is a block diagram of an electronic document and a viewable document, in accordance with one or more embodiments.

Referring now to FIG. 1b, there is illustrated a block diagram of a portion of a memory 30, which may comprise one or more devices of memory 24 of computing system 10, for example. Memory 30 may store electronic data 36 in one or more addressable memory locations. According to an embodiment, electronic data 36 may represent at least a portion of an electronic document, as will be explained in more detail later. Data 36 may be utilized to generate a viewable document 34 on an electronic display 32. Electronic display 32 may comprise display 18 of FIG. 1a, for example. Viewable document 34 may comprise a visual representation of the electronic document represented by electronic data 36 stored in memory 30, for example. Electronic data 36 may comprise a compilation of electronic data that may be expressed and/or represented on a computing system such as system 10 in one or more data formats and/or in one or more data files. Electronic data 36 may be stored in multiple memory devices and/or locations, as explained previously, and may include one or more types of data, explained in more detail hereinafter.

Figure 1C:
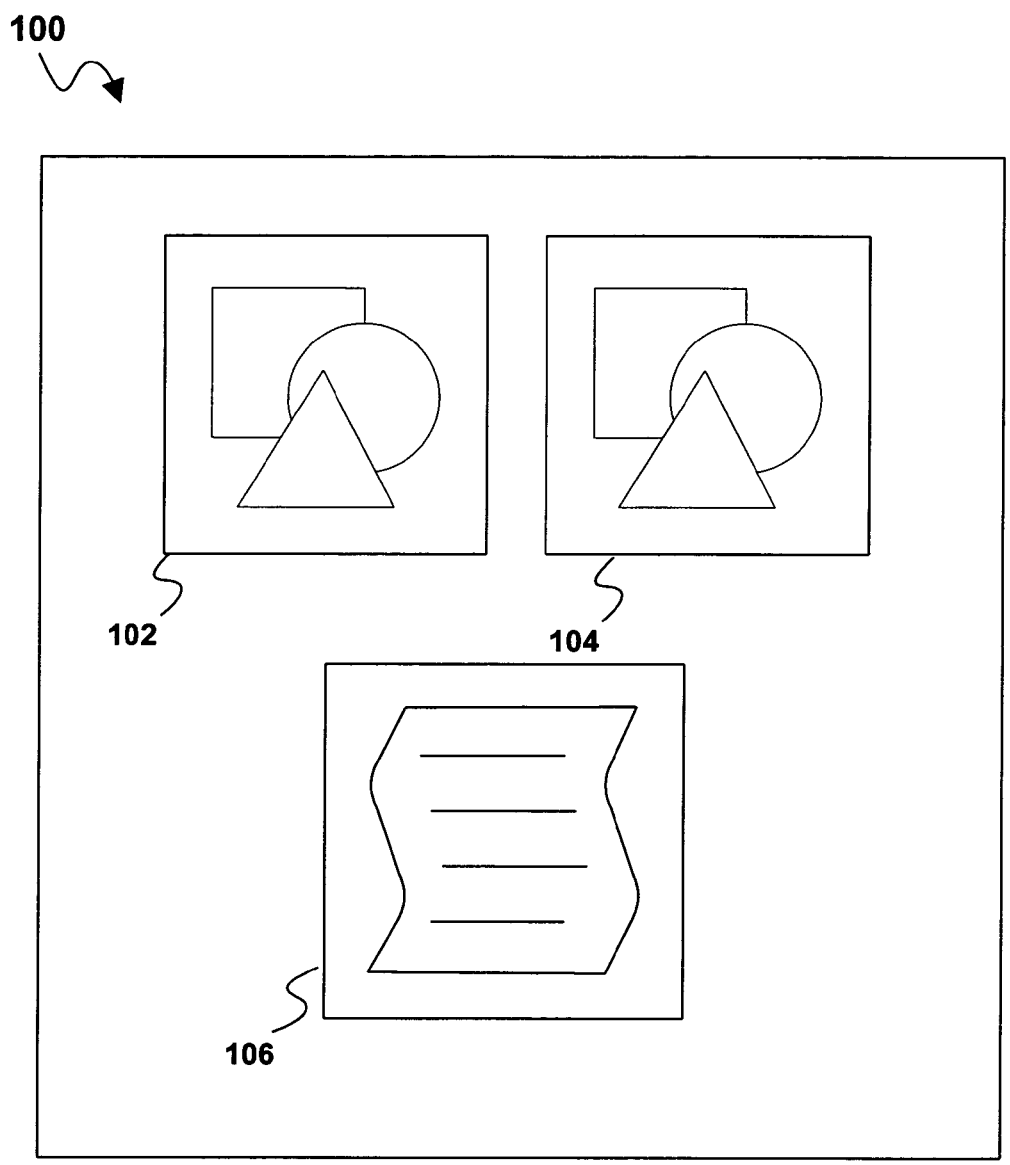
FIG. 1c is a block diagram of a viewable document, in accordance with one or more embodiments.

Referring now to FIG. 1c, there is illustrated a visual representation of an electronic document, displayed as viewable document 100. Viewable document 100 may be displayed on a display device, such as display 18 of system 10, or may be embodied in print form, such as on sheets of media, for example. Viewable document 100 may comprise a visual representation of a compilation of electronic data that may be expressed and/or represented on a computing system memory in one or more data formats and/or in one or more data files. Viewable document 100 may include viewable objects 102, 104 and 106, which may comprise a visual representation of one or more objects. The objects may be expressed and/or represented in one or more data formats and/or one or more data files on a computing system. Although not limited in this respect, the electronic document represented by viewable document 100 may be created by use of a content creation or editing program interface, such as one or more of the products included in Adobe® CreativeSuite®, such as Adobe® InDesign® CS or the like, available from Adobe Systems Incorporated of San Jose, Calif., USA. In one embodiment, if formed by use of the aforementioned Adobe® InDesign® CS, the electronic document represented by viewable document 100 may be in particular data format, such as a proprietary data format, and may not be accessible without the program interface. One or more of the objects represented by viewable objects 102, 104 and 106 may comprise digital media assets, for example. Although viewable objects 102 and 104 are illustrated as graphics, and viewable object 106 is illustrated as text, claimed subject matter is not so limited. Digital media assets suitable for use in an electronic document may include video, audio, images, illustrations, graphics, text, tables or the like.

The objects represented by viewable objects 102, 104 and 106, and included as part of viewable document 100 may be referred to as internal or external objects. External objects may comprise digital media assets that may be represented by an extrinsic data file, such as a data file that may be logically distinct from the one or more files representing an electronic document, for example. Additionally, internal objects may comprise a contiguous portion of an electronic document, and may not necessarily be associated with an additional extrinsic electronic file. As an example, the internal objects may comprise portions of text, graphics, symbols or the like that may be included in the one or more data files representing an electronic document, whereas the external objects may comprise extrinsic data files with respect to the data files representing the electronic document. When the electronic document is visually represented on a display device, for example, the electronic document may be configured such as to appear to comprise one or more of the external objects.

The electronic document represented by viewable document 100 may include formatting data. The formatting data may provide formatting for a particular media, such as print or electronic media, such that the electronic document, when represented in this particular media, may have desirable properties, such as a desirable appearance. For example, viewable document 100 may comprise a printed document. The electronic document represented by viewable document 100 may include formatting data such that the printed document of the electronic document has a desirable appearance. However, it is worthwhile to note that the electronic document represented by viewable document 100 in a print form is not limited to this particular use. In this context, suitability for a particular use may refer generally to the properties of the electronic document. The properties may include formatting data and/or other types of data that may result in the production of a desirable representation of the document in a particular media. The properties may include formatting, resolution, size, color, contrast or grayscale, as just a few examples.

It may be desirable to utilize an electronic document suitable for one particular use for one or more uses other than the particular use. In one example, an electronic document may be suitable to produce a visual representation in the form of a printed document. It may be desirable to utilize the electronic document for other uses, such as to form a web page. However, use of an electronic document in this manner may result in the production of a web page not having desired properties, such as undesirable formatting, resolution or one or more other properties. Additionally, the electronic document that may be suitable for forming a printed document may include additional data, such as formatting data that may not necessarily be utilized when forming a web page. The electronic document may also be formed in a proprietary data format such that the electronic document may be accessible by use of specialized software, for example. It may be desirable to package the electronic document in such as manner as to provide accessibility to the packaged document by use of one or more types of software applications. When packaged, the packaged electronic document may be utilized for one or more uses, and may not necessarily have formatting limitations as described previously. Packaging of the electronic document is explained in more detail herein.

Figure 2:
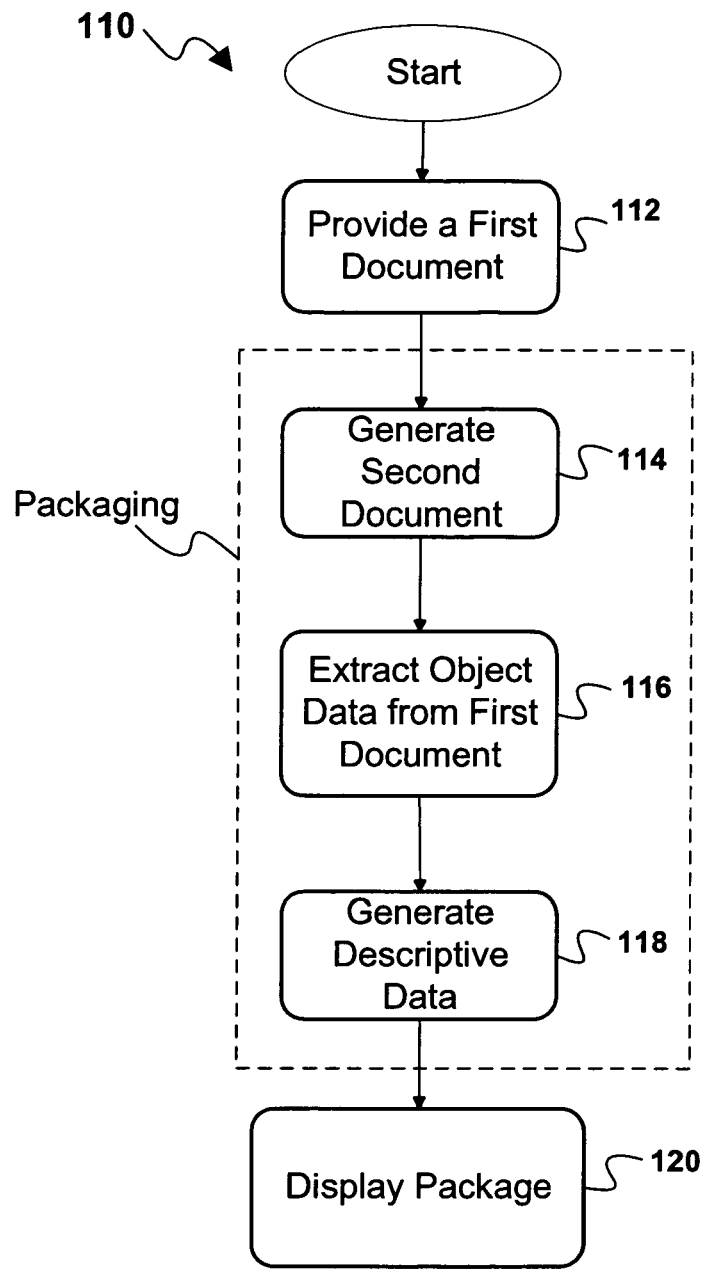
FIG. 2 is a flow diagram illustrating a process of packaging an electronic document, in accordance with one or more embodiments.

FIG. 2 is a flow diagram according to one embodiment of a process 110 of packaging an electronic document. However, for flow diagrams presented herein, the order in which the blocks are presented does not necessarily limit claimed subject matter to any particular order. Additionally, intervening blocks not shown may be employed without departing from the scope of claimed subject matter. Flow diagrams depicted herein may, in alternative embodiments, be implemented in a combination of hardware software and/or firmware, such as part of a computer system. In flow diagram 110, at block 112, a first document may be provided. The first document may comprise an electronic document, which comprise one or more data files that may be represented by viewable document 100 of FIG. 1c. The first document may be formed by use of document authoring software, such as the above-noted Adobe® InDesign® CS, although claimed subject matter is not so limited, and may be formed in one or more manners and/or may be embodied in one or more data formats. The first document may include one or more objects, which again may comprise one or more data files. The objects may be external and/or internal objects, and may comprise digital media assets, such as described previously. Blocks 114-118 as presented herein may illustrate packaging of the first document.

At block 114, a second document may be generated. The second document may comprise an electronic document that may be represented in one or more data files and/or one or more data formats. The second document may be capable of being represented in a data format different from a data format used to represent the first document. The second document may be generated based at least in part on the first document. In one example, the second document may be represented by one or more data files in physical markup language format, such as an Adobe® Portable Document Format (pdf) file specified by Adobe Systems Incorporated of San Jose, Calif., USA. In one context, generating the second document may be referred to as rendering the first document in to the second document. Rendering, in one embodiment, may comprise applying a set of rules and/or heuristics to process the data representing the first document into data that represents a rendering of the first document. This may incorporate conversion and/or layout operations that may parse data from the first document and apply the data based on a differing data format, for example.

At block 116, as part of the packaging process, data representing one or more objects may be obtained from one or more of the data files. In one embodiment, obtaining the object data may comprise extracting object data from one or more data files representing the objects. The object data may comprise, for example, files additionally representing the first and/or second document, or may comprise extrinsic files with respect to the first and second documents. The extracted object data may comprise digital media asset data, for example, and may comprise internal and/or external object data, such as described previously. In this context, extracting may comprise copying, rendering and/or removing portions of one or more files representing the first document and/or objects, such that the extracted portions may be placed in one or more additional electronic files. The additional electronic files may comprise extrinsic files with respect to the first and second document, for example.

At block 118, descriptive data for one or more portions of object data extracted at block 116 may be generated. The descriptive data may comprise data relating to, indexing and/or describing one or more aspects of the extracted object data. The descriptive data may include: positioning data of objects within the first document, such as coordinate data; geometric data including size; dimensions; relative position from other objects; structure such as type of object; document type definition (DTD) data, such as may be represented in a DTD file; or one or more other types of data that may be utilized as descriptive data, and may additionally include references to files that represent the objects. Although the method for generating descriptive data may depend on a particular type of data, in one embodiment, geometric data may be generated, and may be generated based on the first document, for example. Although the generated descriptive data may be expressed and/or represented in any one of multiple types of data formats, in one embodiment the descriptive data may comprise an electronic file in Extensible Markup Language (XML).

The combination of the second document formed at block 114, the object data extracted at block 116 and the descriptive data generated at block 118 may, in a particular embodiment, may comprise a package of the first document. A package will be explained below in more detail with reference to FIG. 5. The process of generating the second document, extracting object data, such as from one or more data files and generating descriptive data of the extracted objects may be referred to as packaging of the first document. Packaging refers generally to a process wherein portions of one or more files representing an electronic document and/or one or more objects may be converted, extracted, copied, transformed and/or rendered into one or more additional electronic files and/or data formats. For example, an electronic document and/or one or more objects may be represented in a plurality of electronic files, and in one or more data formats. The package of the electronic document may comprise one or more additional electronic files, and may be represented in one or more data formats, such as a differing data format with respect to the plurality of electronic files representative of the electronic document and/or one or more objects.

At block 120, the package formed at blocks 114-118 may be at least partially displayed as a visual representation of the package, and may be displayed on a display device, for example. Displaying the package may comprise displaying a visual representation of the object data extracted at block 116 on an electronic display, and may additionally comprise displaying a visual representation of descriptive data generated at block 118, for example. The displayed representations of objects and descriptive data may be displayed as part of a visual representation of the generated second document. The visual representation may be displayed by use of a GUI, for example, which may comprise authoring software, although claimed subject matter is not so limited. For example, a visual representation of the extracted object data may be displayed by use of Adobe® GoLive®. The extracted object data may comprise internal and/or external object data, and may include digital media asset data. In this embodiment, a visual representation of the extracted object data may be displayed in a similar configuration and/or position within the display as in the first document, but may additionally be displayed as a list, a thumbnail display or a full sized display of the extracted objects, for example.

A visual representation of the objects represented by extracted object data may be displayed with a visual representation of additional data, such as descriptive data. The descriptive data may comprise data generated at block 118, and may comprise data from a generated XML file. A visual representation of the descriptive data may be displayed in response to a selection of a visually represented object, or may be displayed without having an object selected, for example. Such selecting may be performed by positioning the display cursor in a GUI using a device such as a mouse device, for example. A visual representation of the descriptive data may be displayed as boundary data for one or more of the displayed objects, for example. The boundary data may comprise a continuous or substantially continuous outline substantially formed around the periphery of one or more of the objects. This boundary data may be referred to as a bounding box, although the shape may not necessarily comprise a box, but may depend on the shape of the selected portion, for example. Alternatively, the displayed representation of descriptive data may comprise a shading of the displayed object data. The display of descriptive data may comprise boundaries of the object that may be defined in the XML file, and the display of descriptive data may provide the boundaries of a displayed representation of an object, and the boundary data may be utilized if the object is imported into another application or another data format, such as a web page, explained in more detail below.

Figure 3:
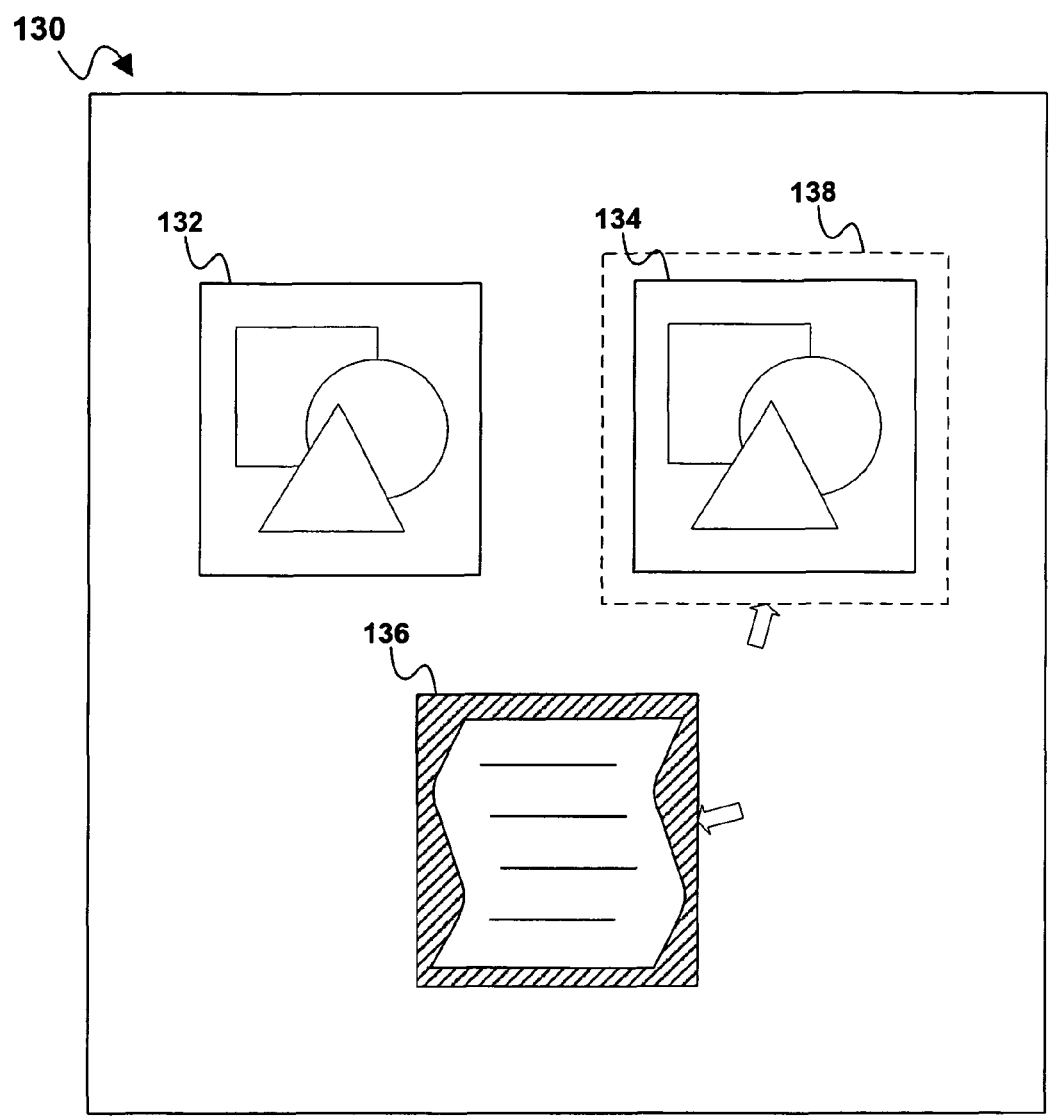
FIG. 3 is a block diagram of a packaged electronic document, in accordance with one or more embodiments.

Referring now to FIG. 3, there is illustrated a block diagram of a visual representation of a package, displayed as viewable package 130. The viewable package 130 may comprise a presentation on an electronic display of images of the package formed by flow diagram 110 and displayed at block 120. In FIG. 3, there is illustrated a viewable package 130 including viewable objects 132, 134 and 136. One or more of the viewable objects may comprise digital media assets, and may comprise external or internal objects, as described previously. Data representative of the objects may be extracted and/or rendered from the viewable document 100, and may be subsequently used to present viewable objects 132, 134 and 136. The viewable package may be presented as part of a rendered version of viewable document 100, which may comprise a visual representation of a pdf file, and may be presented by use of a software application such as the aforementioned Adobe® GoLive®. Viewable objects 132, 134 and 136 may be displayed along with a visual representation of additional data. The additional data may comprise viewable descriptive data, and may be represented in an XML file, for example. A visual representation of the descriptive data may be displayed as boundary data, and may comprise boundaries of the object that may be defined in the XML file. The viewable descriptive data may provide the boundaries of an object, wherein the object may be utilized as part of an electronic document, such as a web page. The viewable objects may be capable of being manipulated, such as "dragged and dropped" into a worksheet of a software application by use of a GUI of a computing system, comprising a pointing device, for example.

The manner of presenting descriptive data may vary. For example, a viewable object 134 may include a bounding box 138. Alternatively, a viewable object 136 may be presented with a shaded region, for example. In one embodiment, the presented image may indicate the boundaries of the viewable object of the viewable package 130, and may indicate which portion of data representative of the selected object may be extracted when imported into another document such as a web page, for example. Descriptive data may be formed by accessing one or more files providing data, such as positioning and/or geometric data. The accessed file(s) may comprise an XML file formed during packaging, as just an example. Such file(s) may be accessed in response to selection of a viewable object, such as by use of a GUI of a computing system, for example.

Figure 4:
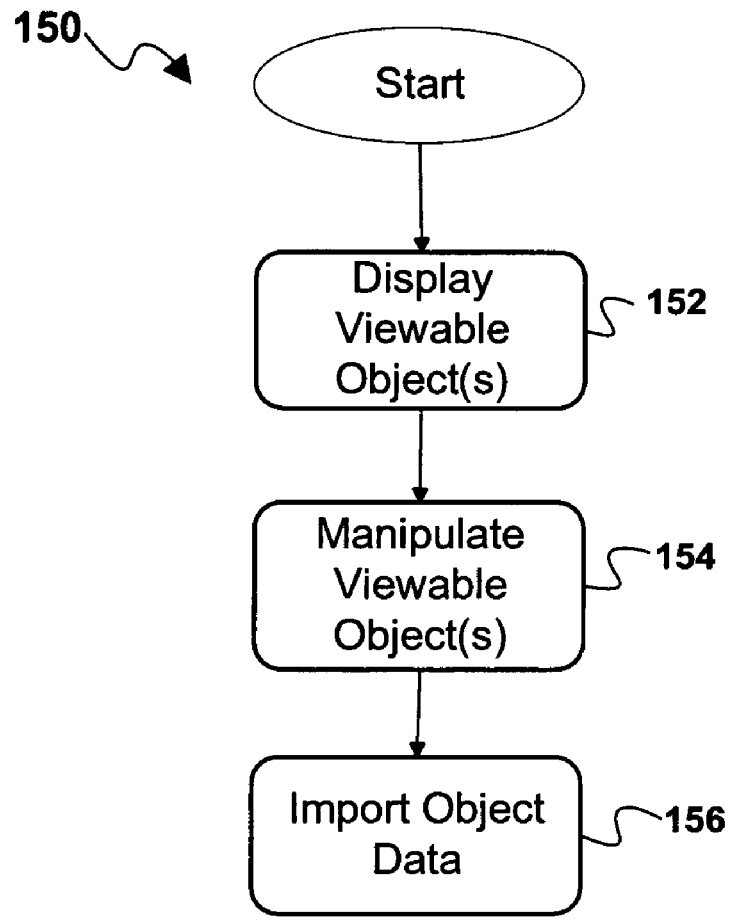
FIG. 4 is a flow diagram illustrating a process of utilizing a packaged electronic document, in accordance with one or more embodiments.

Referring now to FIG. 4, in one embodiment an image may be presented based on an electronic document and/or a package may be displayed and utilized as illustrated by process 150. In this embodiment, at block 152, a visual representation of an electronic document and/or a package of the electronic document may be displayed in a manner described previously, such as with reference to FIGS. 2 and/or 3. Displaying the package may comprise displaying one or more viewable objects, which may comprise digital media assets. The viewable objects may be rendered and/or extracted from an electronic document, such as document 100 of FIG. 1c. The viewable objects may be displayed as illustrated in FIG. 3, as part of a rendered document formed during a packaging process. The viewable objects may be displayed with additional data, such as descriptive data that may be comprise part of the package, for example. The additional data may be displayed in one or more manners, such as described previously. The viewable objects may be displayed by use of an authoring tool, such as Adobe® GoLive®, for example.

One or more viewable objects may be manipulated at block 154, such as by use of a GUI. Manipulating may comprise, for example, "dragging and dropping" the viewable object from one position to another, or may comprise dragging a viewable object from one portion of the software application to another by use of a pointing device, for example. However, these are merely examples of how viewable objects may be manipulated, and claimed subject matter is not limited in this respect, and manipulating may refer to any operation where a viewable object may be selected for importation. For example, a viewable object may be displayed by use of Adobe® GoLive®, in a preview window or as a worksheet. The viewable object may be dragged in to a worksheet window by use of a pointing device used to control movement of a cursor. The worksheet window may comprise a worksheet for authoring a web page, for example.

If manipulated at block 156, data representative of the manipulated viewable object may be imported. Importing, in this context, refers generally to rendering and/or extracting data representative of the manipulated viewable object from one or more data files, and incorporating the object as part of data files representing another document, and/or as part of an authoring tool, for example. The electronic file may comprise a file providing descriptive data for the selected object. In at least one embodiment, the electronic file may comprise an XML file generated during packaging of an electronic document that included the objects, such as the electronic document represented by viewable document 100 of FIG. 1c. If the external object is selected, the importing may comprise accessing the external file, obtaining data representative of the object from the external file, and providing the data to another document. Conversely, an internal object may be rendered from an electronic document, and, when imported, data representative of the rendering may be provided to another document.

Figure 5:
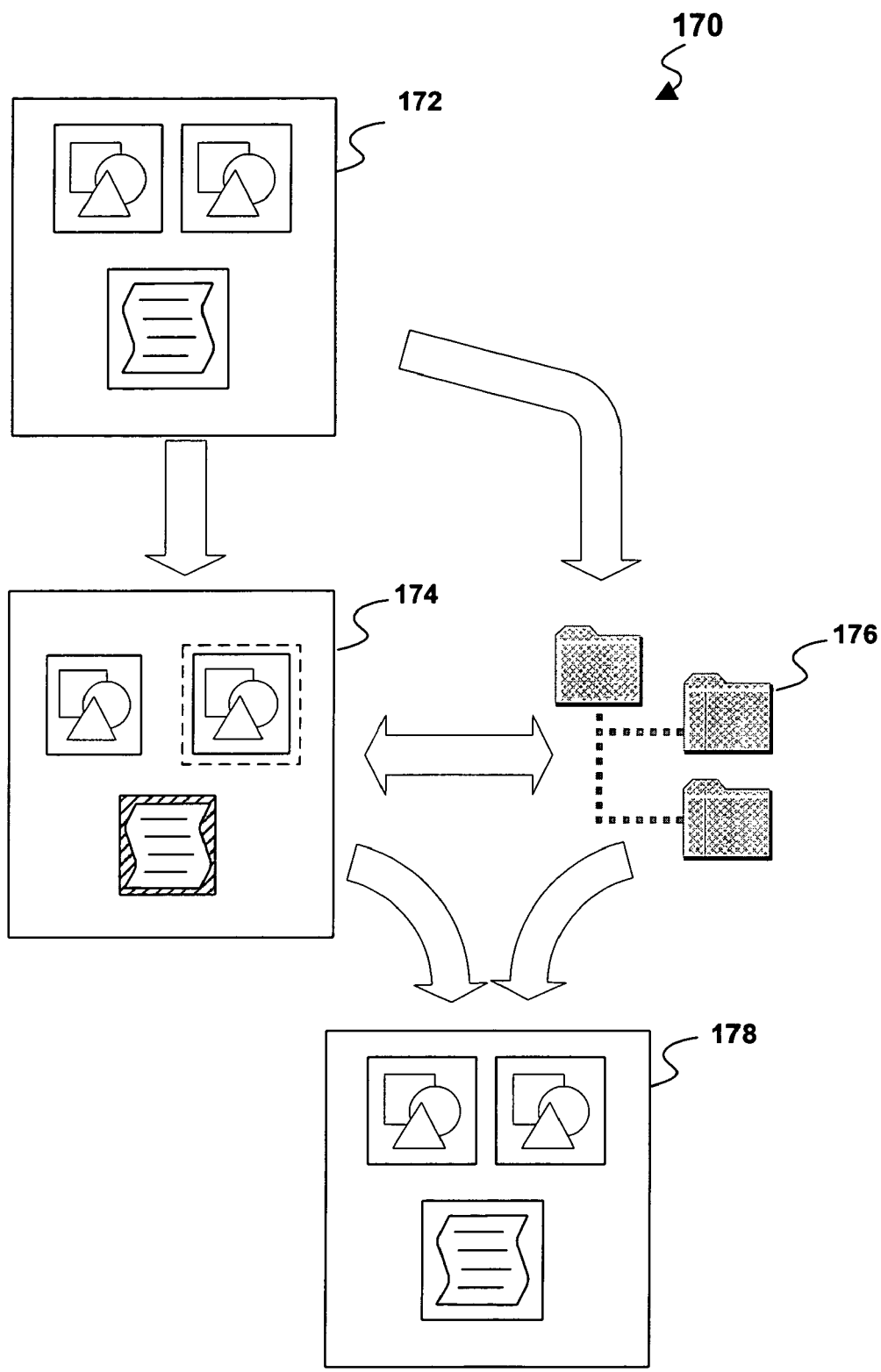
FIG. 5 is a block diagram illustrating the packaging of an electronic document, in accordance with one or more embodiments.

Referring now to FIG. 5, there is illustrated a block diagram of an electronic document packaging process 170. Process 170 may be performed on one or more types of electronic document. The electronic document may be represented in one or more data files, and may be represented in one or a combination of data formats. Data representative of objects, such as digital media assets, may comprise a portion of the one or more data files representing the electronic document, as described previously. In one embodiment, a visual image based on an electronic document is illustrated by document 172. The electronic document may be formed by use of content creation or editing software. The electronic document may be packaged, such as described previously. As part of the packaging process, one or more portions of one or more files representative of document 172 may be extracted and/or rendered, such as data files representative of objects from document 172. Additionally, descriptive data for at least a portion of the objects may be generated. In one embodiment, the descriptive data may be formed as an XML file. A file structure may be formed such as to provide access when displaying the extracted portions and/or the descriptive data, such as displayed as document 174.

A rendering of document 172 may be formed, and the rendering may be displayed as viewable document 174, for example. Viewable document 174 may comprise a visual representation of a portion of a package formed by packaging document 172. As illustrated in FIG. 5, the document 174 may be displayed as a rendered version of document 172, which may comprise a pdf file, and may be displayed by use of a software application such as the aforementioned Adobe® GoLive®. Viewable objects displayed in document 174 may be displayed along with additional data. The additional data may comprise descriptive data, and may be embodied in file(s) 176. The descriptive data may comprise an XML file, and may be displayed as boundary data. For example, the displayed data may comprise boundaries of the object that may be defined in the XML file. The descriptive data may provide the boundaries of an object within an electronic document that may be utilized if data representative of the object is imported into an additional electronic document, such as a web page. The viewable objects may be capable of being manipulated, such as "dragged and dropped" into a worksheet of the software application, as explained previously. If manipulated, data representative of the manipulated objects may be imported and/or incorporated into one or more data files representative of another document. A visual representation of the other document may be displayed by use of the software application, and in one embodiment the document may comprise a document embodied in HyperText Markup Language (HTML) format.

Document 178 may comprise a visual representation of the objects manipulated in document 174. Data representative of the objects may be imported by use of file(s) 176, such as explained previously. Document 178 may be displayed by use of authoring software, such as Adobe® GoLive®, for example. Document 178 may comprise an HTML document, and, in at least one embodiment may comprise a "worksheet" that may provide a preview of a web page that may be formed by the importation of data representative of the objects of document 174. Thus, an electronic document may be packaged, such that the electronic document may be accessed by use of one or more types of software applications. The packaged document may be utilized for varying uses, such as to author a web page, for example.

It is now appreciated, based at least in part on the foregoing disclosure, that a combination of hardware, software and/or firmware may be produced capable of performing one or more of the functions as described herein. It will additionally be understood that, although particular embodiments have just been described, claimed subject matter is not limited in scope to a particular embodiment or implementation. For example, a system capable of implementing one or more of the foregoing operations may comprise hardware, such as implemented to operate on a device or combination of devices, for example, whereas another embodiment may be in software and hardware, for example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method, comprising:
    accessing a first document,
        wherein the first document comprises objects including one or more internal objects and one or more external objects,
        wherein the one or more external objects are sourced from one or more digital media assets stored as electronic files separate from an electronic file for the first document,
        wherein the first document is formatted for a first type of visual media;
    packaging at least a portion of the first document into a package, wherein the packaging comprises:
        generating a second document from the first document, wherein the second document comprises a rendering of at least a portion of the first document;
        extracting at least a portion of the internal objects and external objects including digital media assets from the first document to form one or more electronic files separate from the electronic file for the first document and separate from an electronic file for the second document,
            wherein the extracted digital media assets are for one or more external objects of the second document; and
        generating an electronic file comprising descriptive data for objects extracted from the first document,
            wherein the descriptive data is generated based at least in part on the first document and
            wherein the descriptive data comprises positioning data and geometric data from the first document for the one or more objects extracted from the first document;
        wherein the package comprises the electronic file for the second document, the one or more electronic files for the extracted objects, and the electronic file for the descriptive data;
        wherein the package is usable for creating a third document formatted for a second type of visual media that is a different type of visual media than the first type of visual media.

2. The method of claim 1, and further comprising:
    displaying at least a portion of the one or more digital media assets, wherein the displayed digital media assets comprise descriptive data.

3. The method of claim 2, wherein the displayed descriptive data comprises object coordinate data of a selected portion of a digital media asset.

4. The method of claim 3, wherein the object coordinate data is displayed as boundary data formed around the digital media asset.

5. The method of claim 1,
wherein the descriptive data further comprises one or more of: reference data for the digital media assets, asset coordinate data, asset dimensions, asset structure data, or preference data for the one or more digital media assets.

6. The method of claim 1, wherein the generated electronic file comprises an Extensible Markup Language (XML) file.

7. The method of claim 6, wherein the XML file comprises Document Type Definition (DTD) data relating to one or more of the digital media assets.

8. The method of claim 1, wherein the second document comprises a portable document file.

9. The method of claim 1, wherein the digital media assets comprise one or more of: digital images, graphics, audio, video, and/or text.

10. A method, comprising:
accessing a package comprising a first electronic file for descriptive data, one or more electronic files for objects extracted from an original document, and an electronic file for a rendering of the original document,
wherein the original document is formatted for a first type of visual media,
wherein the package is usable for creating a second document formatted for a second type of visual media that is a different type of visual media than the first type of visual media,
wherein the descriptive data is generated based at least in part on the first original document, and
wherein the descriptive data comprises positioning data and geometric data from the original document for the one or more objects extracted from the original document;
displaying one or more objects from the one or more electronic files of the package,
wherein an object of the one or more objects is selectable, and
wherein said displaying comprises displaying a visual representation of the descriptive data; and
in response to receiving an indication of a selection of the object:
importing at least a portion of the object to the second document, based at least in part on the descriptive data,
wherein the second document is formatted for the second type of visual media that is a different type of visual media than the first type of visual media.

11. The method of claim 10, wherein at least a portion of the objects comprise digital media assets.

12. The method of claim 11, wherein the digital media assets comprise one or more of: digital images, graphics, audio, video, and/or text.

13. The method of claim 10, wherein the second document is embodied in HyperText Markup Language (HTML) format.

14. The method of claim 10, wherein the importing further comprises: obtaining the selected object; and incorporating the selected object in the second document.

15. The method of claim 14, wherein obtaining comprises rendering and/or extracting the object from the displayed document.

16. A machine-readable medium having stored thereon instructions that when executed perform a method, comprising:
accessing a first document,
wherein the first document comprises objects including one or more internal objects and one or more external objects,
wherein the one or more external objects are sourced from one or more digital media assets stored as electronic files separate from an electronic file for the first document,
wherein the first document is formatted for a first type of visual media;
packaging at least a portion of the first document into a package, wherein the packaging comprises:
generating a second document from the first document, wherein the second document comprises a rendering of at least a portion of the first document;
extracting at least a portion of the internal objects and external objects including digital media assets from the first document to form one or more electronic files separate from the electronic file for the first document and separate from an electronic file for the second document,
wherein the extracted digital media assets are for one or more external objects of the second document; and
generating an electronic file comprising descriptive data for objects extracted from the first document,
wherein the descriptive data is generated based at least in part on the first document and
wherein the descriptive data comprises positioning data and geometric data from the first document for the one or more objects extracted from the first document;
wherein the package comprises the electronic file for the second document, the one or more electronic files for the extracted objects, and the electronic file for the descriptive data;
wherein the package is usable for creating a third document formatted for a second type of visual media that is a different type of visual media than the first type of visual media.

17. The machine-readable medium of claim 16, wherein the instructions, when executed, perform a method further comprising:
displaying at least a portion of the one or more digital media assets, wherein the displayed digital media assets comprise descriptive data.

18. The machine-readable medium of claim 17, wherein the displayed descriptive data comprises object coordinate data of a selected portion of an asset.

19. The machine-readable medium of claim 18, wherein the object coordinate data is displayed as boundary data formed around the digital media asset.

20. The machine-readable medium of claim 16,
wherein the descriptive data further comprises one or more of: reference data for the digital media assets, asset coordinate data, asset dimensions, asset structure data, or preference data for the one or more digital media assets.

21. The machine-readable medium of claim 16, wherein the generated electronic file comprises an Extensible Markup Language (XML) file.

22. The machine-readable medium of claim 21, wherein the XML file comprises Document Type Definition (DTD) data relating to one or more of the digital media assets.

23. The machine-readable medium of claim 16, wherein the second document comprises a portable document file.

24. The machine-readable medium of claim 16, wherein the digital media assets comprise one or more of: digital images, graphics, audio, video, and/or text.

25. A machine-readable medium having stored thereon instructions that when executed perform a method, comprising:
   accessing a package comprising a first electronic file for descriptive data, one or more electronic files for objects extracted from an original document, and an electronic file for a rendering of the original document,
      wherein the original document is formatted for a first type of visual media,
      wherein the package is usable for creating a second document formatted for a second type of visual media that is a different type of visual media than the first type of visual media,
      wherein the descriptive data is generated based at least in part on the original document, and
      wherein the descriptive data comprises positioning data and geometric data from the original document for the one or more objects extracted from the original document;
   displaying one or more objects from the one or more electronic files of the package,
      wherein an object of the one or more objects is selectable, and
      wherein said displaying comprises displaying a visual representation of the descriptive data; and
   in response to receiving an indication of a selection of the object:
      importing at least a portion of the object to the second document, based at least in part on the descriptive data,
         wherein the second document is formatted for the second type of visual media that is a different type of visual media than the first type of visual media.

26. The machine-readable medium of claim 25, wherein at least a portion of the objects comprise digital media assets.

27. The machine-readable medium of claim 26, wherein the digital media assets comprise one or more of: digital images, graphics, audio, video, and/or text.

28. The machine-readable medium of claim 25, wherein the second document is embodied in HyperText Markup Language (HTML) format.

29. The machine-readable medium of claim 25, wherein the importing further comprises: obtaining the selected object; and incorporating the selected object in the second document.

30. The machine-readable medium of claim 29, wherein comprises rendering and/or extracting the object from the displayed document.

31. An apparatus, comprising:
   means for accessing a first document,
      wherein the first document comprises objects including one or more internal objects and one or more external objects,
      wherein the one or more external objects are sourced from one or more digital media assets stored as electronic files separate from an electronic file for the first document,
      wherein the first document is formatted for a first type of visual media;
   means for packaging at least a portion of the first document into a package, wherein the means for packaging comprises:
      means for generating a second document from the first document,
         wherein the second document comprises a rendering of at least a portion of the first document;
      means for extracting at least a portion of the internal objects and external objects including digital media assets from the first document to form one or more electronic files separate from the electronic file for the first document and separate from an electronic file for the second document,
         wherein the extracted digital media assets are for one or more external objects of the second document; and
      means for generating an electronic file comprising descriptive data for objects extracted from the first document,
         wherein the descriptive data is generated based at least in part on the first document and
         wherein the descriptive data comprises positioning data and geometric data from the first document for the one or more objects extracted from the first document;
      wherein the package comprises the electronic file for the second document, the one or more electronic files for the extracted objects, and the electronic file for the descriptive data;
      wherein the package is usable for creating a third document formatted for a second type of visual media that is a different type of visual media than the first type of visual media.

32. The apparatus of claim 31, and further comprising:
   means for displaying at least a portion of the one or more digital media assets, wherein the displayed digital media assets comprise descriptive data.

33. The apparatus of claim 32, wherein the displayed descriptive data comprises object coordinate data of a selected portion of an asset.

34. The apparatus of claim 33, wherein the object coordinate data is displayed as boundary data formed around the digital media asset.

35. The apparatus of claim 31,
   wherein the descriptive data further comprises one or more of: reference data for the digital media assets, asset coordinate data, asset dimensions, asset structure data, or preference data for the one or more digital media assets.

36. The apparatus of claim 35, wherein the generated electronic file comprises an Extensible Markup Language (XML) file.

37. The apparatus of claim 36, wherein the XML file comprises Document Type Definition (DTD) data relating to one or more of the digital media assets.

38. The apparatus of claim 31, wherein the second document comprises a portable document file.

39. The apparatus of claim 31, wherein the digital media assets comprise one or more of: digital images, graphics, audio, video, and/or text.

* * * * *